United States Patent [19]

Atchley et al.

[11] 4,258,664

[45] Mar. 31, 1981

[54] FLARED VALVE HOUSING BODY

[75] Inventors: Frank W. Atchley; Donald W. Vorbeck, both of Napa, Calif.

[73] Assignee: Atco Manufacturing Co., Inc., Napa, Calif.

[21] Appl. No.: 45,017

[22] Filed: Jun. 4, 1979

[51] Int. Cl.³ .............................................. A01K 7/00
[52] U.S. Cl. ..................................... 119/72.5; 119/75
[58] Field of Search ................................ 119/75, 72.5

[56] References Cited

U.S. PATENT DOCUMENTS

| 3,179,085 | 4/1965 | McKillip, Jr. | 119/75 |
| 3,611,999 | 10/1971 | Hey | 119/72.5 |
| 3,698,431 | 10/1972 | Thompson | 119/72.5 |
| 3,734,063 | 5/1973 | Atchley | 119/72.5 |

FOREIGN PATENT DOCUMENTS 437506  12/1974  U.S.S.R. .................... 119/72.5

Primary Examiner—Hugh R. Chamblee
Attorney, Agent, or Firm—James R. Cypher

[57] ABSTRACT

An improved valve device for self-service watering of animals which delivers water through a pivotal, control member which includes a flared housing permitting greater movement of the control member and results in improved trouble free operation.

1 Claim, 7 Drawing Figures

FLARED VALVE HOUSING BODY

BACKGROUND

This invention is an improvement of U.S. Pat. No. 3,734,063, hereafter sometimes referred to as the '063 valve. The '063 valve has been very successful and had been installed in farms and animal feed lots throughout the world. The construction and operation of the valve of the present invention is nearly identical to the construction and operation of the '063 valve except that the housing is formed with a flared extension surrounding a portion of the control valve.

There are many self actuated valves on the market and several will be identified and discussed in this application.

One of the problems common to self actuated and unguarded valves is the fact that the animals waste water by opening the valve by scratching themselves on the end of the control member or simply opening the valve accidentally by crowding up against it. On warm days some animals learn that they can convert the drinking valve into a shower by nudging the control member with any part of their body. Some of the animals such as pigs even learn that by partially blocking the end of the control valve they can even create a spray shower. The result of this abuse is wastage of water, which in arid areas or even farm areas such as California, which suffer from water drought from time to time is a serious problem. Needless to say, mudholes in barnyards and feed lots caused by animals playing with valves causes workers a great deal of extra work.

A problem which occurs to self-actuated valves in cold climates is the accumulation of ice beneath the control lever which renders the valves inoperative. The reason for the formation of "icicles" at the extreme tip end of the control valve results from the wind chill and radiation heat loss.

Some mechanical failures of the self actuated valves occurs due to build-up of dry dirt and dry food lodging between the housing wall and the control valve. Other failures occur from wet food build-up from food carried in the animals mouth when it is drinking. The problem of inoperation due to debris build-up results from the inside walls of the housing being parallel to the control member. When the control member is pivoted, a wedge shaped zone is created between the two walls. If debris becomes wedged in this triangular shaped zone, each operation of the control valve forces the debris further back into the valve. As new debris is added, the build-up continues until the valve cannot be opened or will open to such a slight degree that large animals can no longer receive a sufficient supply of water.

The problem of feed build-up between the pivoting lever and the housing was recognized in U.S. Pat. No. 3,613,642 granted to Restall, et al. Restall, taught the use of a slot in the housing beneath the nozzle to prevent debris build up. Apparently the Restall valve was particularly subject to debris build-up since the tapered nozzle was replaced in an alternate form of the invention with a lever located outside the housing. Little is known about the Restall device since to date Applicants have not seen the device on the market.

Restall's tapered nozzle and straight sided sleeve form a wedge which would contribute to the natural build-up of debris which would block the narrow opening valve.

U.S. Pat. No. 3,289,635 is another example of a mouth actuated watering device which has no means of preventing the build-up of debris.

Watering devices with lever actuated valves in which the water flows around the lever rather than through the lever with guards surrounding the lever are quite common. One watering valve is manufactured by Hjalmarsons of Sweden. The lever is parallel to the walls of the guard and debris build-up is a problem.

A slightly different shaped guard is sold by La Buvette of France in which the guard is slightly curved to form a channel in the bottom portion of the guard to allow the pig a better grip on the valve and to channel the water below the solid lever.

SUMMARY OF THE INVENTION

The gist of the present invention is the use of a flared valve housing body surrounding the distal free moving portion of the control valve member.

The present invention solves the problem of water wastage due to the animals taking baths and showers or accidentally turning the water on by scratching themselves on the valve or simply turning it on by crowding against the valve.

The flared end permits greater control valve travel therefore providing a larger area of valve opening. The increased valve opening is crucial to an adequate water supply where the water pressure is low. The increased valve opening also provides self-flushing action by allowing larger particles of silt, rust flakes and foreign objects in the water supply to pass the valve opening.

Increased valve opening and flushing also reduces the risk and incidence of valve leakage caused by entrapment of debris under the tilt valve head.

The increased movement of the pivoting control member provides intrinsic safety from valve malfunction (and dry failure) from mechanical defects in lever arm concentricity, animal abuse, wear, and compression deformation of valve seals.

The flared housing counteracts the occasional problem of valve malfunction from packing and plugging of the valve body when animals use the valve with food in their mouths. The valve body plugging resulting from inward wedging action described above is lessened because in the present invention, when the valve control member is operated to its furtherest point, the control member is now generally parallel to the valve housing rather than at an angle to it. The flared body causes food to be mashed between the parallel surfaces then spills out the flared end when the lever control is released. Due to the flared end, the food is actually forced out of the valve, not back into the valve as it is with parallel walls.

A slotted hole in the valve extension directly below the control lever arm permits any slow drippage to escape and thereby avoid build up of ice beneath the lever at the tip end. It also serves as an exit hole for release of any food particles or debris that become entrapped around the control lever. The benefit of the slotted hole is especially evident in the situation of slow dripping as is column after 2-3 years service when valve seals become worn and the water freezes and forms "icicles" at the tip end of the control valve.

DESCRIPTION OF THE PREFERRED EMBODIMENTS

Figure 1:
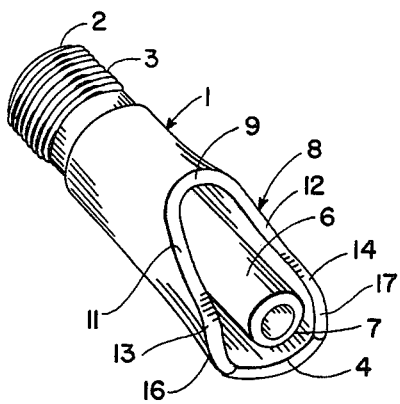
FIG. 1 is a perspective view of the valve housing of the present invention.
Figure 2:
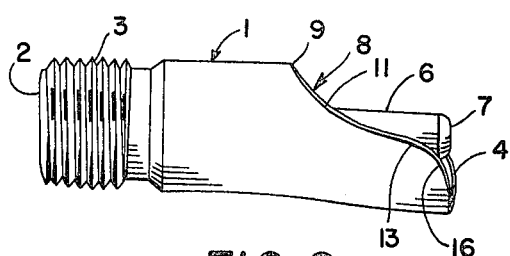
FIG. 2 is a side view of the device of FIG. 1.
Figure 3:
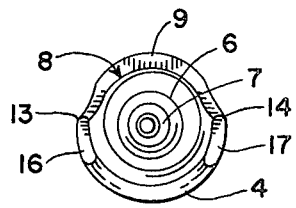
FIG. 3 is a front end view of the device of FIG. 1.
Figure 4:
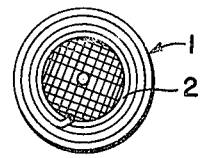
FIG. 4 is a rear end view of the device of FIG. 1.
Figure 5:
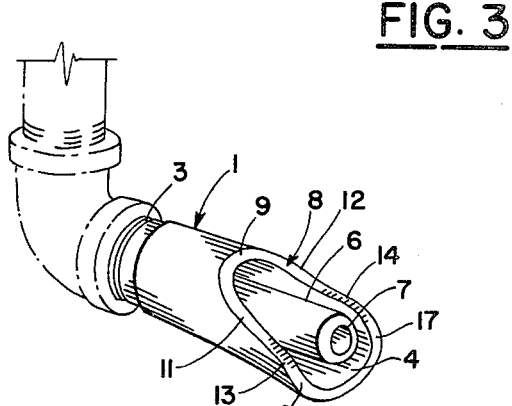
FIG. 5 is a perspective view of the device installed on a pipe.
Figure 7:
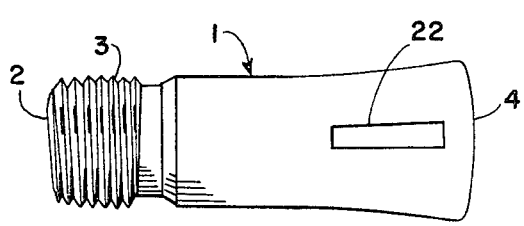
FIG. 7 is a bottom plan view of the device of FIG. 1.

The improved demand delivery watering valve for animals includes a housing 1 having an end 2 adapted for connection to a water supply. Generally the housing is formed with threads 3 for connection to a threaded water pipe outlet. The housing is formed with an open distal end 4. An internal valvig means is mounted within the housing and may be similar to the valving means described in U.S. Pat. No. 3,734,063. The valving means includes an elongated animal actuated control device 6 having a free distal end 7 and is mounted for pivotal movement from a closed position which is generally parallel to the housing to an actuated position in which the control member is at an angle to the control housing. Means such as springs or rubber members automatically close the valving means.

The improvement includes a housing which extends beyond the distal end of the control device and terminates immediately adjacent thereto. A cutout portion 8 is formed in the upper distal end of the housing which extends from a point 9 which is about ⅓rd the length of the housing from the distal end of the housing. The cutout extends along curved lines 11 and 12 to shoulders 13 and 14 near the distal end and then curves outwardly along curved lines 16 and 17 to the distal end. There are several commercially available water valves in which a cutout of this nature occurs.

Figure 6:
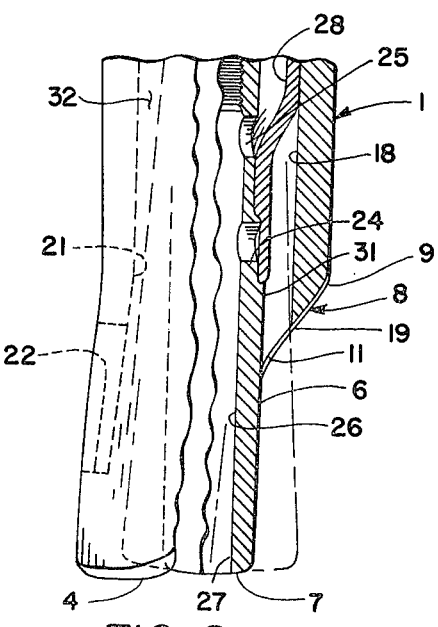
FIG. 6 is an enlarged side view of a portion of the device with portions removed.

The control device 6 is mounted generally coaxially within and spaced from the inner walls 18 of the housing. The control member pivots as shown in the broken lines in FIG. 6 until it strikes the inner wall of the housing. The control member can pivot over a 360° range and strikes the upper wall at point 19 and strikes the lower wall generally at point 21 which is coextensive with the beginning of the flared portion. From point 21 the outer wall of the housing is flared outwardly at an angle. The end of the housing adjacent the distal end is formed so that it is generally parallel to the control member when the control member is moved to a fully actuated open position.

The housing is formed with an elongated slot 22 which is parallel to the control device in the lower portion of the housing. The slot is preferably located in the housing at or near the beginning point 21 of the flare and extends along the flared portion.

The control device may be either hollow or solid. In the preferred form of the invention, the control device is formed with one or more passages 24 and 25 through the wall thereof to receive water. A passage 26 is formed in the control member to carry water to the open distal end 27. Means 28 such as a rubber boot may be used to divert the supply of water into the openings 24 and 25 in the control device for passage therethrough.

In operation, the control device is depressed by an animal until the outer wall 31 of the control device strikes the inner wall 18 of the housing at some point on its 360° range. If the animal has food in its mouth when it is drinking some of it will be left on the flared portion of the inner wall of the housing. As the animal drinks and pivots the control device or the next time that an animal drinks, the food particles will be mashed between the control device and the inner wall. Some of the food will be extruded through slot 22 and other food will simply be flushed out of the flared portion or fall out of the downwardly sloping end. Any food which moves back into the triangular section 32 between the flared point 21 and pivotally mounted end of the control member will have little effect or restriction of the control member.

We claim:

1. An improved demand delivery watering valve for animals including a housing having an end adapted for connection to a water supply and a distal end, internal valving means mounted within said housing including an elongated animal actuated control device having a free distal end mounted for pivotal movement from a closed position to an angular actuated position and means for automatically closing said internal valving means; said improvement comprising:
    a. said housing extends beyond said distal end of said control device and terminates immediately adjacent thereto and is formed with a cutout portion exposing an upper portion of said control device for actuation by an animal;
    b. said control device is mounted coaxially within and spaced from an inner wall of said housing;
    c. said distal end of said housing is flared outwardly over a substantial portion of the length thereof so as to be parallel to said control device when said control device is in said fully actuated position and forming a downwardly slopping portion; and
    d. said housing in said flared distal end is formed with an elongated slot of substantial length parallel to said control device in the lower portion of said housing beginning at a point adjacent the beginning point of said downwardly slanting portion.

* * * * *